US012651021B2

(12) United States Patent
Ng et al.

(10) Patent No.: US 12,651,021 B2
(45) Date of Patent: Jun. 9, 2026

(54) DIGITAL CONTENT MANAGEMENT IN VIRTUAL ENVIRONMENTS

(71) Applicant: Roblox Corporation, San Mateo, CA (US)

(72) Inventors: Spencer William Ng, San Mateo, CA (US); Joseph Liu, San Mateo, CA (US); Mahesh Kumar Nandwana, Sunnyvale, CA (US); Oleksandr Zhukov, San Mateo, CA (US); Frederick William Umminger, III, Oakland, CA (US)

(73) Assignee: Roblox Corporation, San Mateo, CA (US)

( * ) Notice: Subject to any disclaimer, the term of this patent is extended or adjusted under 35 U.S.C. 154(b) by 50 days.

(21) Appl. No.: 18/295,744

(22) Filed: Apr. 4, 2023

(65) Prior Publication Data

US 2024/0338408 A1     Oct. 10, 2024

(51) Int. Cl.
G06F 16/635 (2019.01)
A63F 13/63 (2014.01)
(Continued)

(52) U.S. Cl.
CPC ............ G06F 16/635 (2019.01); A63F 13/63 (2014.09); G06F 3/0482 (2013.01); G06F 3/165 (2013.01);
(Continued)

(58) Field of Classification Search
CPC ...... G06F 16/635; G06F 3/0482; G06F 3/165; G06F 16/638; G06F 16/65; A63F 13/63; H04S 7/30; H04S 2400/11
See application file for complete search history.

(56) References Cited

U.S. PATENT DOCUMENTS

2012/0185068 A1* 7/2012 Eppolito .............. G11B 27/034
                                                            700/94
2015/0154385 A1* 6/2015 Chastagnol ........ H04N 21/8545
                                                            707/756
(Continued)

FOREIGN PATENT DOCUMENTS

CN         107204183 B  * 7/2020  ............. G10L 15/02
WO    WO-2014096832 A1 * 6/2014  ........... G10H 1/0008

OTHER PUBLICATIONS

"Approximate Nearest Neighbors Benchmarks", http://ann-benchmarks.com/, 27 pages.
(Continued)

*Primary Examiner* — Aleksandr Kerzhner
*Assistant Examiner* — Samuel C Sharpless, III
(74) *Attorney, Agent, or Firm* — IP Spring

(57) ABSTRACT

Implementations described herein relate to methods, systems, and computer-readable media for digital content management. In some implementations, the method includes receiving, by a processor, an audio file, determining whether there is a match of a segment of the audio file with one or more reference audio files, if it is determined that there is no match, classifying the audio file as an authentic audio file, and if it is determined that there is the match, identifying, one or more designated audio segments that are semantically similar to the segment, and replacing the segment of the audio file with a particular designated audio segment of the one or more designated audio segments.

17 Claims, 7 Drawing Sheets

(51) Int. Cl.

| | |
|---|---|
| *G06F 3/0482* | (2013.01) |
| *G06F 3/16* | (2006.01) |
| *G06F 16/638* | (2019.01) |
| *G06F 16/65* | (2019.01) |
| *H04S 7/00* | (2006.01) |

(52) U.S. Cl.
CPC ............ *G06F 16/638* (2019.01); *G06F 16/65* (2019.01); *H04S 7/30* (2013.01); *H04S 2400/11* (2013.01)

(56) References Cited

U.S. PATENT DOCUMENTS

2019/0197187 A1* 6/2019 Zhang ..................... G06F 16/71
2024/0134908 A1* 4/2024 Mahfuz ................. G06F 16/638

OTHER PUBLICATIONS

"FAISS", https://github.com/facebookresearch/faiss, 3 pages.
"FMA Music", https://github.com/mdeff/fma, 2021, 6 pages.
"ScaNN", https://github.com/google-research/google-research/tree/master/scann, 3 pages.
"YAMNet", https://github.com/tensorflow/models/tree/master/research/audioset/yamnet, 2021, 4 pages.
Deldjoo, et al., "Content-driven Music Recommendation: Evolution, State of the Art, and Challenges", arXiv preprint arXiv:2107.11803, 2021, 29 pages.
Kim, et al., "A music recommendation system with a dynamic k-means clustering algorithm", Sixth International Conference on Machine Learning and Applications (ICMLA 2007), Cincinnati, OH, USA, doi: 10.1109/ICMLA.2007.97., 2007, pp. 399-403.
Li, et al., "Content-Based Music Similarity Search and Emotion Detection", 2004 IEEE International Conference on Acoustics, Speech, and Signal Processing. vol. 5, 2004, 4 pages.
Schedl, "Deep Learning in Music Recommendation Systems", https://www.frontiersin.org/articles/10.3389/fams.2019.00044/full, 2019, 27 pages.
Van Den Oord, et al., "Deep content-based music recommendation", Advances in neural information processing systems 26, 2013, 9 pages.

* cited by examiner

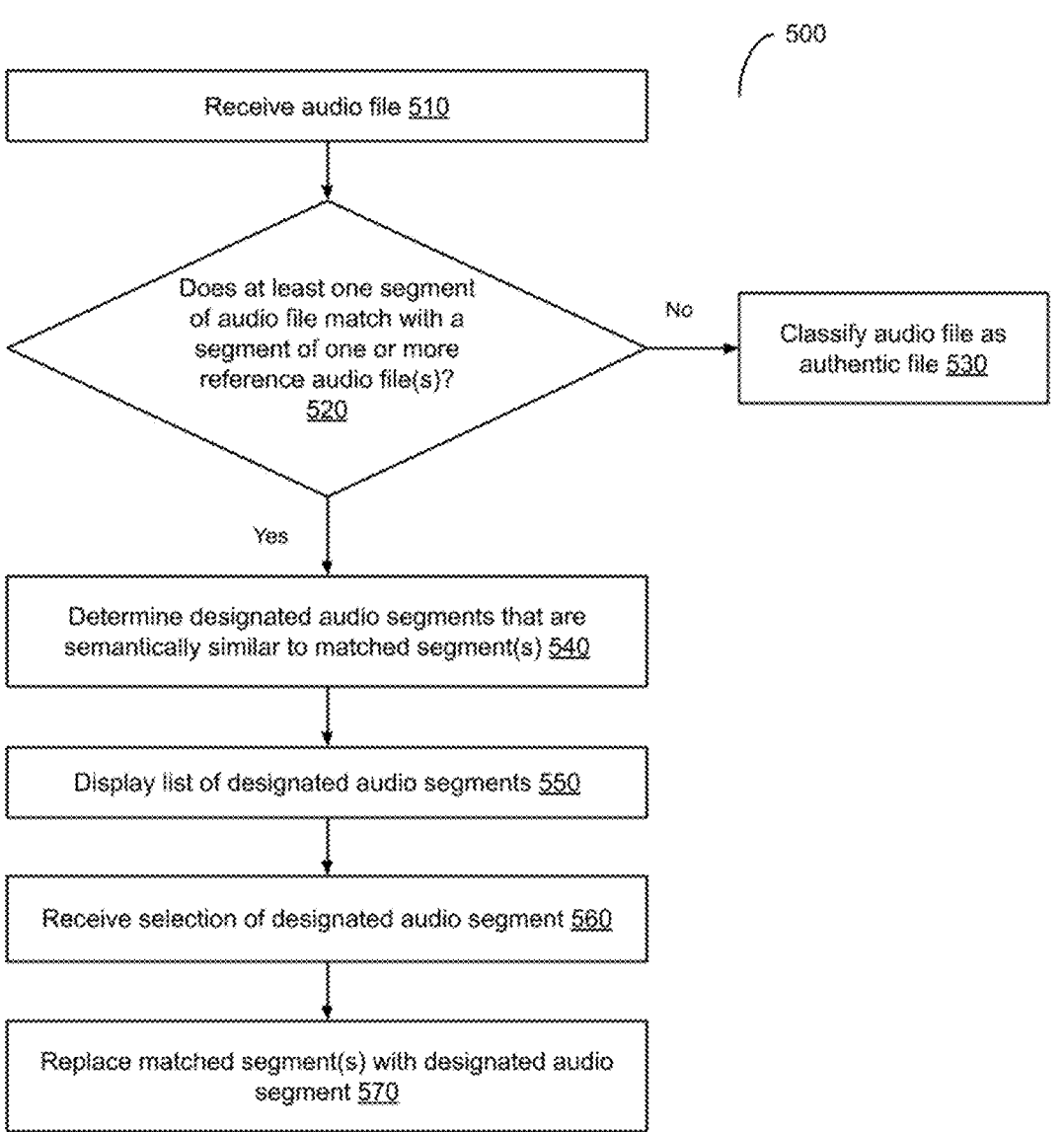

500

Receive audio file 510

Does at least one segment of audio file match with a segment of one or more reference audio file(s)? 520

No → Classify audio file as authentic file 530

Yes

Determine designated audio segments that are semantically similar to matched segment(s) 540

Display list of designated audio segments 550

Receive selection of designated audio segment 560

Replace matched segment(s) with designated audio segment 570

FIG. 5

DIGITAL CONTENT MANAGEMENT IN VIRTUAL ENVIRONMENTS

TECHNICAL FIELD

Embodiments relate generally to computer-based virtual experiences, and more particularly, to methods, systems, and computer readable media to manage digital content for virtual environments.

BACKGROUND

Some online virtual experience platforms allow users to connect with each other, interact with each other (e.g., within a virtual experience), create virtual experiences, and share information with each other via the Internet. Users of online virtual experience platforms may participate in multiplayer environments (e.g., in virtual three-dimensional environments), design custom environments, design characters and avatars, design, simulate, or create sounds that are utilized within the environments, decorate avatars, exchange virtual items/objects with other users, communicate with other users using audio or text messaging, and so forth. Users may utilize audio, video, and other digital content to enhance the virtual experience.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a computer-implemented method that includes receiving, by a processor, an audio file; determining whether there is a match of a segment of the audio file with one or more reference audio files; if it is determined that there is no match, classifying the audio file as an authentic audio file; and if it is determined that there is the match: identifying, one or more designated audio segments that are semantically similar to the segment; and replacing the segment of the audio file with a particular designated audio segment of the one or more designated audio segments. Other embodiments of this aspect include corresponding computer systems, apparatus, and computer programs recorded on one or more computer storage devices, each configured to perform the actions of the methods.

Implementations may include the computer-implemented method where the audio file is associated with a virtual environment, and where the audio file is played to generate sound within the virtual environment during one or more of: gameplay and user participation in the virtual environment. The computer-implemented method may include: displaying, via a user interface, a listing of the one or more designated audio segments; and receiving, via the user interface, selection of the particular designated audio segment of the one or more designated audio segments. The computer-implemented method may include: obtaining a plurality of sliding window segments of the audio file, each sliding window segment with a length less than a length of the audio file; and generating a respective embedding for one or more of the plurality of sliding window segments generated from the audio file. Identifying the one or more designated audio segments that are semantically similar may include identifying one or more audio segments associated with respective embeddings that lie within a threshold distance from an embedding of the segment. Identifying the one or more audio segments may include performing a vector approximate nearest neighbors search. Performing the vector approximate nearest neighbors search may include: obtaining a plurality of sliding window segments of the audio file, each sliding window segment with a length less than a length of the audio file; generating a respective embedding for one or more of the plurality of sliding window segments generated from the audio file; and performing a search based on a plurality of sliding window embeddings generated from the audio file. The computer-implemented method may include determining a second plurality of designated audio segments from the one or more designated audio segments based on a second predetermined threshold distance. Identifying the one or more designated audio segments may include determining a match based on a vector distance between an embedding of the segment and an embedding of one or more of the designated audio segments in the reference set. Implementations of the described techniques may include hardware, a method or process, or computer software on a computer-accessible medium.

The non-transitory computer-readable medium also includes receiving an audio file; determining whether there is a match of a segment of the audio file with one or more reference audio files; if it is determined that there is no match, classifying the audio file as an authentic audio file; and if it is determined that there is the match: identifying, one or more designated audio segments that are semantically similar to the segment; and replacing the segment of the audio file with a particular designated audio segment of the one or more designated audio segments. Other embodiments of this aspect include corresponding computer systems, apparatus, and computer programs recorded on one or more computer storage devices, each configured to perform the actions of the methods.

Implementations may include the non-transitory computer-readable medium where the audio file is associated with a virtual environment, and where the audio file is played to generate sound within the virtual environment during one or more of: gameplay and user participation in the virtual environment. The operations further may include: displaying, via a user interface, a listing of the one or more designated audio segments; and receiving, via the user interface, selection of the particular designated audio segment of the one or more designated audio segments. The operations further may include obtaining a plurality of sliding window segments of the audio file, each sliding window segment with a length less than a length of the audio file; and generating a respective embedding for one or more of the plurality of sliding window segments generated from the audio file. Identifying the one or more designated audio segments that are semantically similar may include identifying one or more audio segments associated with respective embeddings that lie within a threshold distance from an embedding of the segment. Implementations of the described techniques may include hardware, a method or process, or computer software on a computer-accessible medium.

The system also includes a memory with instructions stored thereon; and a processing device, coupled to the memory, the processing device configured to access the memory and execute the instructions, where the instructions cause the processing device to perform operations including: receiving, by the processing device, an audio file; determining whether there is a match of a segment of the audio file with one or more reference audio files; if it is determined that there is no match, classifying the audio file as an authentic audio file; and if it is determined that there is the match: identifying, one or more designated audio segments that are semantically similar to the segment; and replacing the segment of the audio file with a particular designated audio segment of the one or more designated audio segments. Other embodiments of this aspect include corresponding computer systems, apparatus, and computer programs recorded on one or more computer storage devices, each configured to perform the actions of the methods.

Implementations may include the system where the audio file is associated with a virtual environment, and where the audio file is played to generate sound within the virtual environment during one or more of: gameplay and user participation in the virtual environment. Identifying the one or more designated audio segments that are semantically similar may include identifying one or more audio segments associated with respective embeddings that lie within a threshold distance from an embedding of the segment. Identifying the one or more audio segments may include performing a vector approximate nearest neighbors search. Performing the vector approximate nearest neighbors search may include: obtaining a plurality of sliding window segments of the audio file, each sliding window segment with a length less than a length of the audio file; generating a respective embedding for one or more of the plurality of sliding window segments generated from the audio file; and performing a search based on a plurality of sliding window embeddings generated from the audio file. The operations further may include storing embeddings associated with a reference set of the one or more designated audio segments in an index, and wherein identifying the one or more designated audio segments may include determining a match based on a vector distance between an embedding of the segment and an embedding of one or more of the designated audio segments in the reference set. Implementations of the described techniques may include hardware, a method or process, or computer software on a computer-accessible medium.

BRIEF DESCRIPTION OF THE DRAWINGS

FIG. 5 is a flowchart illustrating an example method to replace particular detected segments of an audio file with semantically similar designated segments, in accordance with some implementations.

4

Figure 7:
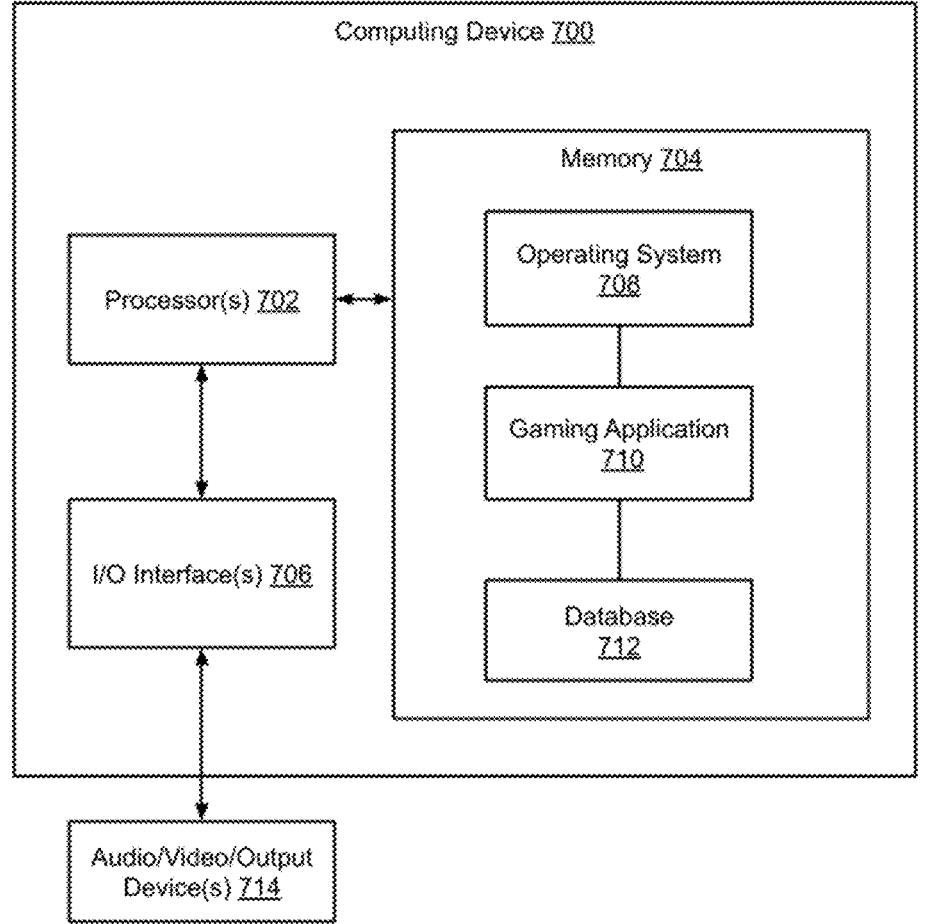

FIG. 7 is a block diagram illustrating an example computing device, in accordance with some implementations.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are contemplated herein.

References in the specification to "some embodiments", "an embodiment", "an example embodiment", etc. indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be effected in connection with other embodiments whether or not explicitly described.

Online virtual experience platforms (also referred to as "user-generated content platforms" or "user-generated content systems") offer a variety of ways for users to interact with one another. For example, users of an online virtual experience platform may work together towards a common goal, share various virtual experience items, send electronic messages to one another, and so forth. Users of an online virtual experience platform may join virtual experience(s), e.g., games or other experiences as virtual characters, playing specific roles. For example, a virtual character may be part of a team or multiplayer environment wherein each character is assigned a certain role and has associated parameters, e.g., clothing, armor, weaponry, skills, etc. that correspond to the role. In another example, a virtual character may be joined by computer-generated characters, e.g., when a single player is part of a game.

An online virtual experience platform may also enable users to experience sounds from the virtual environment. For example, sound may be generated to simulate footsteps as an avatar moves around within the virtual environment, sound may be generated to provide background music in a virtual scene, sound may be generated to simulate the sound(s) of a waterfall that is part of the virtual environment, sound may be generated to mimic the sound of people in a stadium, etc. The online virtual experience platform may additionally support sounds in the context of virtual concerts, virtual karaoke, etc. Generated sounds may include musical pieces, sounds from various objects in the virtual environment, or sounds that may not be specifically associated with a particular object, e.g., thunder, etc.

Many multiplayer online virtual experiences take place in a simulated three-dimensional (3D) reality, a virtual world. The virtual experiences include simulated sounds generated by both the environment and each player. For example: footsteps of avatars (characters), background music, musical pieces used for enhancing a scene, rustle from clothing and accessories worn by the avatars, noise from objects being utilized by the avatar(s), explosions, roars of monsters, crumbling of collapsing buildings, etc.

One or more of the sounds may be part of digital assets offered for use by the virtual experience platform, e.g., created by and/or on behalf of the virtual experience platform while other sounds may be user generated sounds and/or user uploaded sounds. In some implementations, the virtual experience platform may provide an online tool that can be utilized by users to upload audio files and/or other user-generated assets for others to use within experiences supported by the virtual experience platform. These assets (e.g., sound effects, background music, image textures, etc.) may contribute towards creating an immersive environment and be used by developer users to set the tone of various experiences for other users of the platform, e.g., game players, participants in online concerts, etc.

However, some users may upload disallowable content (e.g., copyrighted assets, objectionable assets, age-inappropriate content, etc.) assets to use in their experiences, which are commonly detected by the virtual experience platform and removed in order to mitigate/prevent copyright and/or other violations via the platform.

In some implementations, copyrighted content (e.g., copyrighted audio content) may be detected and automatically replaced with content that has been previously vetted by the platform, and that is permitted for use on the virtual experience platform. For example, a limited number of licensed or open source music tracks may be made available on the platform for use in replacement of detected copyrighted content. Similarly, other types of copyrighted assets (e.g., images) may be replaced with a generic asset or permitted asset of the same type.

Naive or random replacement of assets may negatively impact the user experience on the virtual experience platform since creators may no longer be able to achieve their intended vision for their created experiences if the replaced assets do not fit within a cohesive style/tone that matches other assets within the virtual experience. In some scenarios, creators and/or the virtual experience platform may have to remove the certain assets, e.g., copyrighted assets without a license for use, or modify the particular virtual experience.

In some scenarios, where the detected assets are replaced by another asset of the same type, user experience (e.g., game player experience) may be affected, particularly if the replacement asset does not fit well into the experience, thus impacting user engagement. In some scenarios, asset replacement may be necessary due to technical constraints, e.g., a failure of a server or cache that stores the asset, geographic or other restrictions on use of particular assets that may make the assets unavailable for particular users, etc.

A technical problem for virtual application platform operators is timely detection and suitable replacement of disallowed or unavailable digital assets within a virtual environment.

The present disclosure addresses the above-described drawbacks by utilizing a detection mechanism for disallowed or impermissible digital content and automatically providing creators and/or developer users with semantically similar content of the same type for use in a virtual experience. For example, when audio content for a particular virtual experience is detected to be impermissible, permissible audio segments that are semantically similar to the audio content may be identified and suggested via a user interface to a user. In some implementations, permissible audio segments that are semantically similar to the audio content may be identified and be utilized to automatically replace impermissible content. The detection of impermissible content and the identification/suggesting of content may be performed in real-time by utilizing techniques of this disclosure, thereby providing a superior user experience.

Per techniques of this disclosure, upon detection of disallowed and/or unavailable content, e.g., content that is unavailable due to system downtime, copyrighted content, objectionable content, age-inappropriate content, etc., creators are automatically prompted to replace the disallowed content with permissible content, e.g., open-source (free to use) content, content licensed by a virtual experience platform operator, etc. The content for replacement that is offered for selection to the developer (creator) is in the same style (similar to) as the original (disallowed) content. For instance, uploaded music (audio) that is detected to be copyrighted can be replaced with licensed music that is available to use on the virtual experience platform.

The replacement of digital assets (content) may be implemented in different workflows. In a first workflow (scenario), a background process may be utilized by the virtual experience platform to detect content that is impermissible for use on the platform. For example, a background process may be utilized to detect potential copyright violations in uploaded audio files during the process of developers (creators) developing experiences and uploading audio content within the virtual experience platform. If it is determined that the content being uploaded is impermissible, a notification may be provided via an interface, e.g., via a user interface on a computing device display, to inform the user that a particular audio is impermissible for use on the virtual experience platform. Additionally, a list of suggested audio clips that are acoustically similar may be displayed on the user interface. Developer (creator) users may then be prompted to purchase and/or use one of the suggested audio clips or to upload a new audio clip of their own. This workflow ensures that impermissible content (e.g., copyrighted audio) is not published on the virtual experience platform, while enabling creators to maintain full creative control over their designed virtual experiences.

In a second workflow (scenario), impermissible content is detected by a search performed on a digital asset database associated with the virtual experience platform. For example, audio copyright violations may be detected within the asset database of the virtual experience by a search of already uploaded audio clips to identify impermissible audio asset(s). Based on the detection of the impermissible (e.g., copyrighted) audio asset(s), audio, all references to the impermissible audio asset across all experiences on the virtual experience platform are redirected from the original audio source to the closest-sounding audio asset that is available for use on the virtual experience platform.

Any negative impact of the replacement of the original audio clip on the user (player, spectator, etc.) experience is minimized due to the replacement audio having similar semantics to the original audio clip (e.g., copyrighted orchestral music is replaced with an orchestral piece that is licensed by the virtual experience platform or a piece that is selected from orchestral pieces that are offered to the public under an open-source license, e.g., a creative commons license). Replacement with an audio clip with similar properties can offer advantages over other approaches where impermissible (e.g., copyrighted material) audio clips are arbitrarily replaced with default audio clips (tracks).

Subsequent to the replacement of the original audio clip, a creator of experiences associated with the original clip is notified via email, and may be provided with an option to retain the automatic replacement audio clip or to select a different audio clip from a set of audio clips similar to the original.

In some implementations, recommendation of a replacement asset (e.g., audio clip) is based on performing a vector approximate nearest neighbors search based on the original asset. Embeddings (e.g., audio embeddings) are determined from the digital asset using machine learning models, and a digital asset replacement recommendation algorithm is utilized to identify replacement assets based on the extracted embeddings.

In some implementations, a database of embeddings of assets is generated by applying suitable embedding extraction algorithms to digital assets that are accessible to the virtual experience platform. For example, audio embeddings may be generated by applying an open-source embedding extraction model, e.g., YAMNet (Yet Another Mobile Network), to a predefined library of licensed music that is accessible to the virtual experience platform. In some other implementations, other deep learning embedding models may be utilized, e.g., Visual Geometry Group (VGGish), Self-Supervised Audio Spectrogram Transformer (SSAST), Pretrained Audio Neural Networks (PANN), etc. In some implementations, custom models that are fine tuned from preexisting models may be utilized.

In some implementations, instead of generating an average of extracted embeddings across an entire audio clip to generate a representation of the audio clip, averages of sliding window segments of embeddings may be generated and stored. The sliding window embeddings can be utilized to match segments of audio clips that are used in experiences to impermissible content to determine content that is to be replaced. The sliding window embeddings can additionally be utilized to match the replaced content against segments of content that can be utilized (e.g., licensed audio clips) on the platform.

Utilization of sliding window segments of the audio files can enable superior detection of relatively short (small) samples of impermissible content such as music that is included within a longer track, thereby enabling the replacement of only those segments that contain impermissible audio within an audio asset. This may be beneficial since user provided content may include portions of different segments of audio, and not all portions of the audio may include impermissible material.

In some implementations, the extracted embeddings are aggregated into a search index for fast embedding lookup. The fast embedding lookup may be performed by utilizing a vector similarity search algorithm, e.g., Facebook AI Similarity Search (FAISS), Scalable Nearest Neighbors (ScaNN), etc. The search index enables the matching of embeddings of designated segments (e.g., portions of licensed audio clips) with embeddings of detected segments of impermissible (e.g., copyrighted music) embeddings to enable the platform to generate recommendations in substantially real-time for the most similar results to the original content for creators to use.

In some implementations, the search algorithm also accounts for the semantic distance between the copyrighted clip and recommendations. In some implementations, results that are too similar may be discarded in favor of more varied suggestions.

Techniques of this disclosure such as applying embedding extraction followed by similarity search lookup can be extended to other digital asset domains with available embedding models, such as image texture assets, short video clips, or 3D meshes, to power content discovery and improve user experience. The techniques may be utilized to alert developers (creators) of their potential use of impermissible content, and to suggest asset replacements in real-time.

Figure 1:
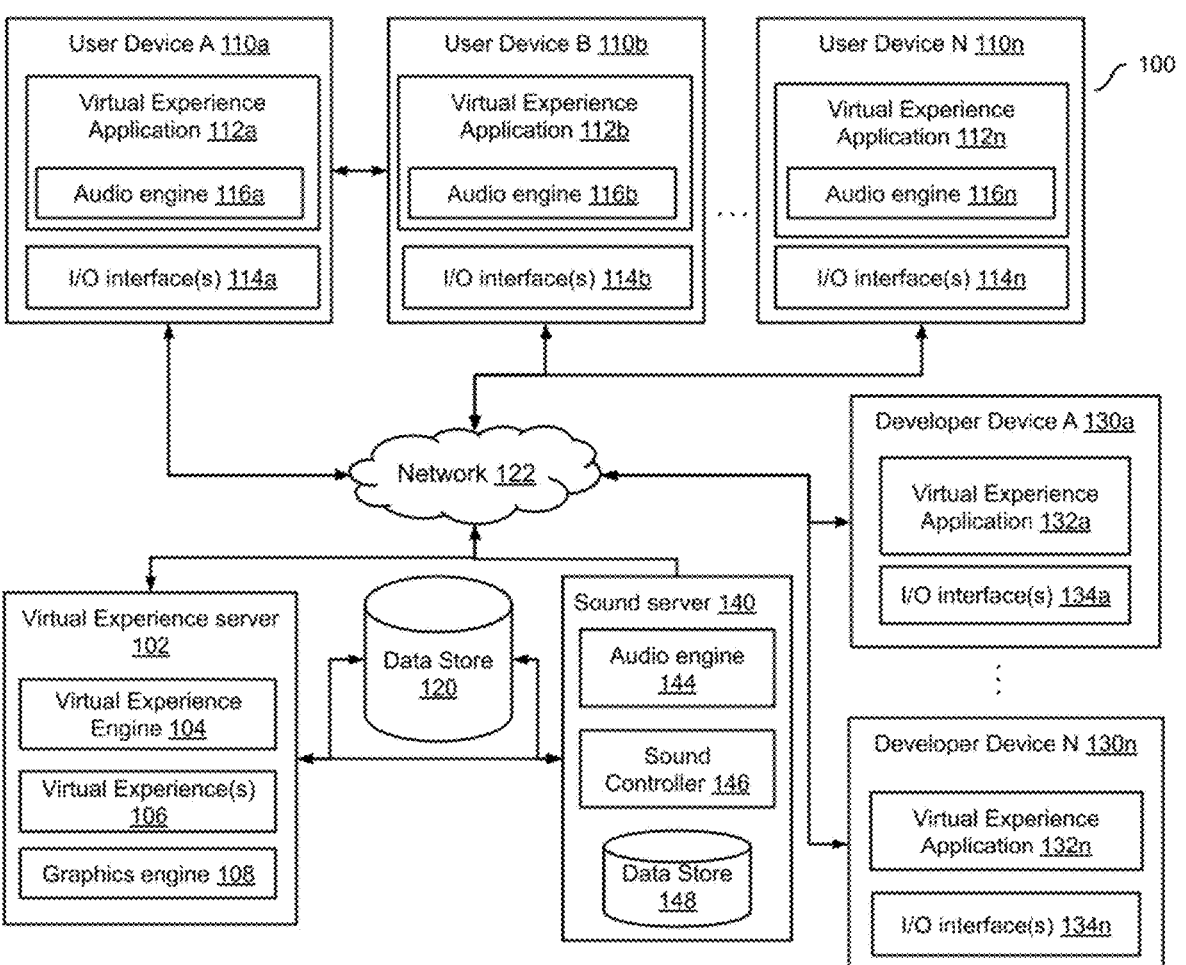
FIG. 1 is a diagram of an example system architecture for content management in a virtual environment, in accordance with some implementations.

FIG. 1 is a diagram of an example system architecture for the distributed processing of sounds in virtual environments, in accordance with some implementations. FIG. 1 and other figures use like reference numerals to identify like elements. A letter after a reference numeral, such as "110," indicates that the text refers specifically to the element having that particular reference numeral. A reference numeral in the text without a following letter, such as "110," refers to any or all of the elements in the figures bearing that reference numeral (e.g., "110" in the text refers to reference numerals "110a," "110b," and/or "110n" in the figures).

The system architecture 100 (also referred to as "system" herein) includes online virtual experience server 102, data store 120, user devices 110a, 110b, and 110n (generally referred to as "user device(s) 110" herein), and developer devices 130a and 130n (generally referred to as "developer device(s) 130" herein), virtual experience server 102, sound server 140, data store 120, user devices 110, and developer devices 130 are coupled via network 122. In some implementations, user devices(s) 110 and developer device(s) 130 may refer to the same or same type of device.

Online virtual experience server 102 can include a virtual experience engine 104, one or more virtual experience(s) 106, and graphics engine 108. A user device 110 can include a virtual experience application 112, and input/output (I/O) interfaces 114 (e.g., input/output devices). The input/output devices can include one or more of a microphone, speakers, headphones, display device, mouse, keyboard, game controller, touchscreen, virtual reality consoles, etc. The input/output devices can also include accessory devices that are connected to the user device by means of a cable (wired) or that are wirelessly connected.

Sound server 140 can include an audio engine 144, and a sound controller 146. In some implementations, the sound server may include a plurality of servers. In some implementations, the plurality of servers may be arranged in a hierarchy, e.g., based on respective prioritization values assigned to sound sources. For example, in some implementations, assignment of generation of one or more sound sources to servers in the hierarchy may be based on a prioritization value associated with the sound source.

Audio engine 144 may be utilized for the generation of one of more sounds that are associated with the virtual environment. Sound controller 146 may be utilized for orchestration of computational resources associated with the generation of sounds, e.g., invoking compute instances for sound generation, load balancing of different processes/instances within a distributed computing environment, etc.

A developer device 130 can include a virtual experience application 132, and input/output (I/O) interfaces 134 (e.g., input/output devices). The input/output devices can include one or more of a microphone, speakers, headphones, display device, mouse, keyboard, game controller, touchscreen, virtual reality consoles, etc.

System architecture 100 is provided for illustration. In different implementations, the system architecture 100 may include the same, fewer, more, or different elements configured in the same or different manner as that shown in FIG. 1.

In some implementations, network 122 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a 5G network, a Long Term Evolution (LTE) network, etc.), routers, hubs, switches, server computers, or a combination thereof.

In some implementations, the data store 120 may be a non-transitory computer readable memory (e.g., random access memory), a cache, a drive (e.g., a hard drive), a flash drive, a database system, a cloud storage system, or another type of component or device capable of storing data. The data store 120 may also include multiple storage components (e.g., multiple drives or multiple databases) that may also span multiple computing devices (e.g., multiple server computers).

In some implementations, the online virtual experience server 102 can include a server having one or more computing devices (e.g., a cloud computing system, a rackmount server, a server computer, cluster of physical servers, etc.). In some implementations, the online virtual experience server 102 may be an independent system, may include multiple servers, or be part of another system or server.

In some implementations, the online virtual experience server 102 may include one or more computing devices (such as a rackmount server, a router computer, a server computer, a personal computer, a mainframe computer, a laptop computer, a tablet computer, a desktop computer, a distributed computing system, etc.), data stores (e.g., hard disks, memories, databases), networks, software components, and/or hardware components that may be used to perform operations on the online virtual experience server 102 and to provide a user with access to online virtual experience server 102. The online virtual experience server 102 may also include a website (e.g., a web page) or application back-end software that may be used to provide a user with access to content provided by online virtual experience server 102. For example, users may access online virtual experience server 102 using the virtual experience application 112 on user devices 110.

In some implementations, online virtual experience server 102 may be a type of social network providing connections between users or a type of user-generated content system that allows users (e.g., end-users or consumers) to communicate with other users on the online virtual experience server 102, where the communication may include voice chat (e.g., synchronous and/or asynchronous voice communication), video chat (e.g., synchronous and/or asynchronous video communication), or text chat (e.g., synchronous and/or asynchronous text-based communication). In some implementations of the disclosure, a "user" may be represented as a single individual. However, other implementations of the disclosure encompass a "user" (e.g., creating user) being an entity controlled by a set of users or an automated source. For example, a set of individual users federated as a community or group in a user-generated content system may be considered a "user."

In some implementations, online virtual experience server 102 may be an online gaming server. For example, the virtual experience server may provide single-player or multiplayer games to a community of users that may access or interact with games using user devices 110 via network 122. In some implementations, games (also referred to as "video game," "online game," or "virtual game" herein) may be two-dimensional (2D) games, three-dimensional (3D) games (e.g., 3D user-generated games), virtual reality (VR) games, or augmented reality (AR) games, for example. In some implementations, users may participate in gameplay with other users. In some implementations, a game may be played in real-time with other users of the game.

In some implementations, gameplay may refer to the interaction of one or more players using user devices (e.g., 110) within a game (e.g., game that is part of virtual experience 106) or the presentation of the interaction on a display or other output device (e.g., 114) of a user device 110.

In some implementations, a virtual experience 106 can include an electronic file that can be executed or loaded using software, firmware or hardware configured to present the game content (e.g., digital media item) to an entity. In some implementations, a virtual experience application 112 may be executed and a virtual experience 106 executed in connection with a virtual experience engine 104. In some implementations, a virtual experience (e.g., a game) 106 may have a common set of rules or common goal, and the environment of a virtual experience 106 shares the common set of rules or common goal. In some implementations, different games may have different rules or goals from one another.

In some implementations, virtual experience(s) may have one or more environments (also referred to as "gaming environments" or "virtual environments" herein) where multiple environments may be linked. An example of an environment may be a three-dimensional (3D) environment. The one or more environments of a virtual experience application 106 may be collectively referred to a "world" or "gaming world" or "virtual world" or "universe" herein. An example of a world may be a 3D world of a game 106. For example, a user may build a virtual environment that is linked to another virtual environment created by another user. A character of the virtual game may cross the virtual border to enter the adjacent virtual environment.

It may be noted that 3D environments or 3D worlds use graphics that use a three-dimensional representation of geometric data representative of game content (or at least present game content to appear as 3D content whether or not 3D representation of geometric data is used). 2D environments or 2D worlds use graphics that use two-dimensional representation of geometric data representative of game content.

In some implementations, the online virtual experience server 102 can host one or more virtual experiences 106 and can permit users to interact with the virtual experiences 106 using a virtual experience application 112 of user devices 110. Users of the online virtual experience server 102 may play, create, interact with, or build virtual experiences 106, communicate with other users, and/or create and build objects (e.g., also referred to as "item(s)" or "game objects" or "virtual game item(s)" herein) of virtual experiences 106. For example, in generating user-generated virtual items, users may create characters, decoration for the characters, one or more virtual environments for an interactive game, or build structures used in a game. In some implementations, users may buy, sell, or trade virtual game objects, such as in-platform currency (e.g., virtual currency), with other users of the online virtual experience server 102. In some implementations, online virtual experience server 102 may transmit game content to virtual experience applications (e.g., 112). In some implementations, game content (also referred to as "content" herein) may refer to any data or software instructions (e.g., game objects, game, user information, video, images, commands, media item, etc.) associated with online virtual experience server 102 or virtual experience applications. In some implementations, game objects (e.g., also referred to as "item(s)" or "objects" or "virtual objects" or "virtual game item(s)" herein) may refer to objects that are used, created, shared or otherwise depicted in virtual experience applications 106 of the online virtual experience server 102 or virtual experience applications 112 of the user devices 110. For example, game objects may include a part, model, character, accessories, tools, weapons, clothing, buildings, vehicles, currency, flora, fauna, components of the aforementioned (e.g., windows of a building), and so forth.

It may be noted that the online virtual experience server 102 hosting virtual experiences 106, is provided for purposes of illustration, rather than limitation. In some implementations, online virtual experience server 102 may host one or more media items that can include communication messages from one user to one or more other users. Media items can include, but are not limited to, digital video, digital movies, digital photos, digital music, audio content, melodies, website content, social media updates, electronic books, electronic magazines, digital newspapers, digital audio books, electronic journals, web blogs, real simple syndication (RSS) feeds, electronic comic books, software applications, etc. In some implementations, a media item may be an electronic file that can be executed or loaded using software, firmware or hardware configured to present the digital media item to an entity.

In some implementations, a virtual application 106 may be associated with a particular user or a particular group of users (e.g., a private game), or made widely available to users with access to the online virtual experience server 102 (e.g., a public game). In some implementations, where online virtual experience server 102 associates one or more virtual experiences 106 with a specific user or group of users, online virtual experience server 102 may associate the specific user(s) with a virtual experience 106 using user account information (e.g., a user account identifier such as username and password).

In some implementations, online virtual experience server 102 or user devices 110 may include a virtual experience engine 104 or virtual experience application 112. In some implementations, virtual experience engine 104 may be used for the development or execution of virtual experiences 106. For example, virtual experience engine 104 may include a rendering engine ("renderer") for 2D, 3D, VR, or AR graphics, a physics engine, a collision detection engine (and collision response), sound engine, scripting functionality, animation engine, artificial intelligence engine, networking functionality, streaming functionality, memory management functionality, threading functionality, scene graph functionality, or video support for cinematics, among other features. The components of the virtual experience engine 104 may generate commands that help compute and render the game (e.g., rendering commands, collision commands, physics commands, etc.) In some implementations, virtual experience applications 112 of user devices 110/116, respectively, may work independently, in collaboration with virtual experience engine 104 of online virtual experience server 102, or a combination of both.

In some implementations, both the online virtual experience server 102 and user devices 110 may execute a virtual experience engine (104 and 112, respectively). The online virtual experience server 102 using virtual experience engine 104 may perform some or all the virtual experience engine functions (e.g., generate physics commands, rendering commands, etc.), or offload some or all the virtual experience engine functions to virtual experience engine 104 of user device 110. In some implementations, each virtual application 106 may have a different ratio between the virtual experience engine functions that are performed on the online virtual experience server 102 and the virtual experience engine functions that are performed on the user devices 110. For example, the virtual experience engine 104 of the online virtual experience server 102 may be used to generate physics commands in cases where there is a collision between at least two virtual application objects, while the additional virtual experience engine functionality (e.g., generate rendering commands) may be offloaded to the user device 110. In some implementations, the ratio of virtual experience engine functions performed on the online virtual experience server 102 and user device 110 may be changed (e.g., dynamically) based on gameplay conditions. For example, if the number of users participating in gameplay of a particular virtual application 106 exceeds a threshold number, the online virtual experience server 102 may perform one or more virtual experience engine functions that were previously performed by the user devices 110.

For example, users may be playing a virtual application 106 on user devices 110, and may send control instructions (e.g., user inputs, such as right, left, up, down, user election, or character position and velocity information, etc.) to the online virtual experience server 102. Subsequent to receiving control instructions from the user devices 110, the online virtual experience server 102 may send gameplay instructions (e.g., position and velocity information of the characters participating in the group gameplay or commands, such as rendering commands, collision commands, etc.) to the user devices 110 based on control instructions. For instance, the online virtual experience server 102 may perform one or more logical operations (e.g., using virtual experience engine 104) on the control instructions to generate gameplay instruction(s) for the user devices 110. In other instances, online virtual experience server 102 may pass one or more or the control instructions from one user device 110 to other user devices (e.g., from user device 110a to user device 110b) participating in the virtual application 106. The user devices 110 may use the gameplay instructions and render the gameplay for presentation on the displays of user devices 110.

In some implementations, the control instructions may refer to instructions that are indicative of in-game actions of a user's character. For example, control instructions may include user input to control the in-game action, such as right, left, up, down, user selection, gyroscope position and orientation data, force sensor data, etc. The control instructions may include character position and velocity information. In some implementations, the control instructions are sent directly to the online virtual experience server 102. In other implementations, the control instructions may be sent from a user device 110 to another user device (e.g., from user device 110b to user device 110n), where the other user device generates gameplay instructions using the local virtual experience engine 104. The control instructions may include instructions to play a voice communication message or other sounds from another user on an audio device (e.g., speakers, headphones, etc.), for example voice communications or other sounds generated using the audio spatialization techniques as described herein.

In some implementations, gameplay instructions may refer to instructions that allow a user device 110 to render gameplay of a game, such as a multiplayer game. The gameplay instructions may include one or more of user input (e.g., control instructions), character position and velocity information, or commands (e.g., physics commands, rendering commands, collision commands, etc.).

In some implementations, the online virtual experience server 102 may store characters created by users in the data store 120. In some implementations, the online virtual experience server 102 maintains a character catalog and game catalog that may be presented to users. In some implementations, the game catalog includes images of virtual experiences stored on the online virtual experience server 102. In addition, a user may select a character (e.g., a character created by the user or other user) from the character catalog to participate in the chosen game. The character catalog includes images of characters stored on the online virtual experience server 102. In some implementations, one or more of the characters in the character catalog may have been created or customized by the user. In some implementations, the chosen character may have character settings defining one or more of the components of the character.

In some implementations, a user's character can include a configuration of components, where the configuration and appearance of components and more generally the appearance of the character may be defined by character settings. In some implementations, the character settings of a user's character may at least in part be chosen by the user. In other implementations, a user may choose a character with default character settings or character setting chosen by other users. For example, a user may choose a default character from a character catalog that has predefined character settings, and the user may further customize the default character by changing some of the character settings (e.g., adding a shirt with a customized logo). The character settings may be associated with a particular character by the online virtual experience server 102.

In some implementations, the user device(s) 110 may each include computing devices such as personal computers (PCs), mobile devices (e.g., laptops, mobile phones, smart phones, tablet computers, or netbook computers), network-connected televisions, gaming consoles, etc. In some implementations, a user device 110 may also be referred to as a "client device." In some implementations, one or more user devices 110 may connect to the online virtual experience server 102 at any given moment. It may be noted that the number of user devices 110 is provided as illustration. In some implementations, any number of user devices 110 may be used.

In some implementations, each user device 110 may include an instance of the virtual experience application 112, respectively. In one implementation, the virtual experience application 112 may permit users to use and interact with online virtual experience server 102, such as control a virtual character in a virtual game hosted by online virtual experience server 102, or view or upload content, such as virtual experiences 106, images, video items, web pages, documents, and so forth. In one example, the virtual experience application may be a web application (e.g., an application that operates in conjunction with a web browser) that can access, retrieve, present, or navigate content (e.g., virtual character in a virtual environment, etc.) served by a web server. In another example, the virtual experience application may be a native application (e.g., a mobile application, app, or a gaming program) that is installed and executes local to user device 110 and allows users to interact with online virtual experience server 102. The virtual experience application may render, display, or present the content (e.g., a web page, a media viewer) to a user. In an implementation, the virtual experience application may also include an embedded media player (e.g., a Flash® player) that is embedded in a web page.

In some implementations, the virtual experience application may include an audio engine 116 that is installed on the user device, and which enables the playback of sounds on the user device. In some implementations, audio engine 116 may act cooperatively with audio engine 144 that is installed on the sound server.

According to aspects of the disclosure, the virtual experience application may be an online virtual experience server application for users to build, create, edit, upload content to the online virtual experience server 102 as well as interact with online virtual experience server 102 (e.g., participate in virtual experiences 106 hosted by online virtual experience server 102). As such, the virtual experience application may be provided to the user device(s) 110 by the online virtual experience server 102. In another example, the virtual experience application may be an application that is downloaded from a server.

In some implementations, each developer device 130 may include an instance of the virtual experience application 132, respectively. In one implementation, the virtual experience application 122 may permit a developer user(s) to use and interact with online virtual experience server 102, such as control a virtual character in a virtual game hosted by online virtual experience server 102, or view or upload content, such as games 106, images, video items, web pages, documents, and so forth. In one example, the virtual experience application may be a web application (e.g., an application that operates in conjunction with a web browser) that can access, retrieve, present, or navigate content (e.g., virtual character in a virtual environment, etc.) served by a web server. In another example, the virtual experience application may be a native application (e.g., a mobile application, app, or a virtual experience program) that is installed and executes local to user device 130 and allows users to interact with online virtual experience server 102. The virtual experience application may render, display, or present the content (e.g., a web page, a media viewer) to a user. In an implementation, the virtual experience application may also include an embedded media player (e.g., a Flash® player) that is embedded in a web page.

According to aspects of the disclosure, the virtual experience application 132 may be an online virtual experience server application for users to build, create, edit, upload content to the online virtual experience server 102 as well as interact with online virtual experience server 102 (e.g., provide and/or play games 106 hosted by online virtual experience server 102). As such, the virtual experience application may be provided to the user device(s) 130 by the online virtual experience server 102. In another example, the virtual experience application 132 may be an application that is downloaded from a server. Virtual experience application 132 may be configured to interact with online virtual experience server 102 and obtain access to user credentials, user currency, etc. for one or more virtual applications 106 developed, hosted, or provided by a virtual experience application developer.

In some implementations, a user may login to online virtual experience server 102 via the virtual experience application. The user may access a user account by providing user account information (e.g., username and password) where the user account is associated with one or more characters available to participate in one or more games 106 of online virtual experience server 102. In some implementations, with appropriate credentials, a virtual experience application developer may obtain access to virtual experience application objects, such as in-platform currency (e.g., virtual currency), avatars, special powers, accessories, that are owned by or associated with other users.

In general, functions described in one implementation as being performed by the online virtual experience server 102 can also be performed by the user device(s) 110, or a server, in other implementations if appropriate. In addition, the functionality attributed to a particular component can be performed by different or multiple components operating together. The online virtual experience server 102 can also be accessed as a service provided to other systems or devices through appropriate application programming interfaces (APIs), and thus is not limited to use in websites.

In some implementations, online virtual experience server 102 may include a graphics engine 108. In some implementations, the graphics engine 108 may be a system, application, or module that permits the online virtual experience server 102 to provide graphics and animation capability. In some implementations, the graphics engine 108 and/or sound server 140 may perform one or more of the operations described below in connection with the flow charts shown in FIGS. 5 and 6.

Figure 2:
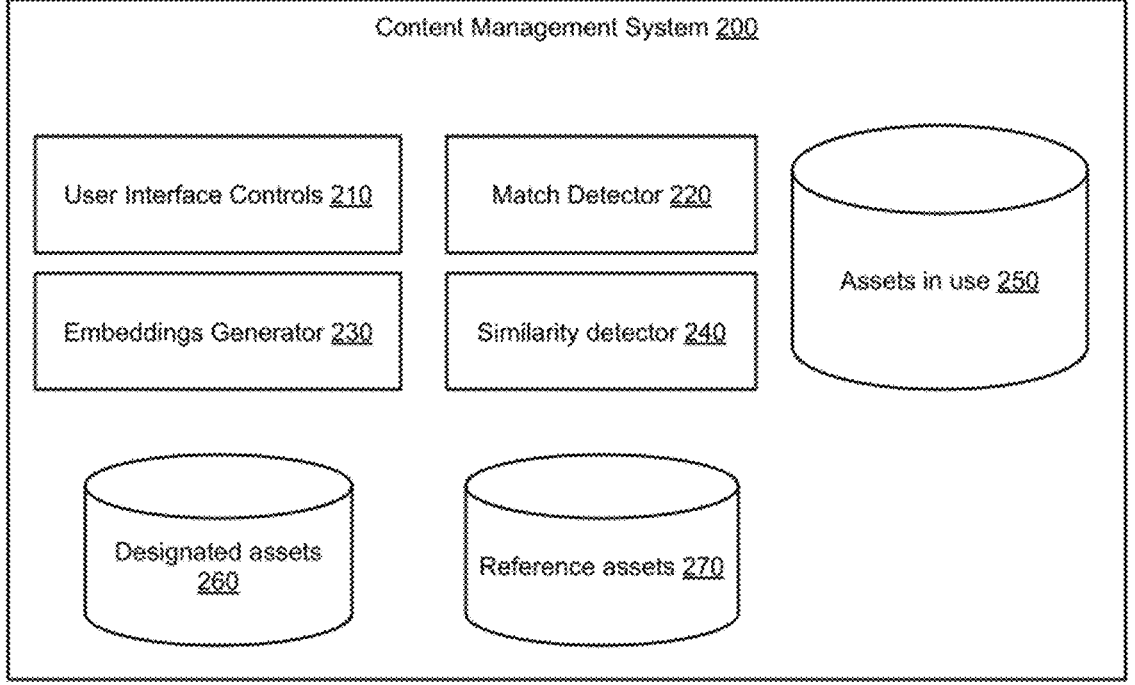
FIG. 2 illustrates an example implementation of a system architecture for content management in a virtual environment, in accordance with some implementations.

FIG. 2 illustrates an example implementation of a system architecture for content management in a virtual environment, in accordance with some implementations.

As depicted in FIG. 2, content management system 200 includes functional modules for digital content management and for the detection of impermissible digital content and to identify and provide suggestions of suitable alternatives.

The content management system includes a module for user interface controls 210, a match detector 220, an embeddings generator 230, and a similarity detector 240.

The content management system additionally includes data stores (e.g., similar to data store 120 depicted in FIG. 1) to store digital content and digital assets; assets in use storage 250, designated assets storage 260, and reference assets 270.

The assets in use storage 250 may be utilized to store digital content and digital assets utilized across the platform. The storage may support scenarios where a particular asset, e.g., audio file, is utilized in a single virtual experience as well as where a particular asset is utilized in multiple virtual experiences across the virtual experience platform. The digital assets may include images, audio files, video clips, etc. In some implementations, the storage may include links, e.g., pointers, uniform record locators (URLs), etc., to other data storage units etc.

The designated asset storage 260 is utilized to include assets that may be licensed to the platform, or assets that are available for purchase on the platform. The assets may be available for free or for purchase by users, e.g., developer users and content creators on the platform. The designated asset storage may include libraries of assets across categories and of different genres.

The reference assets storage 270 is utilized to include a set of reference assets that are known to be impermissible content. The assets may be impermissible for a variety of reasons and may include copyrighted content, proprietary content owned by content creators, etc.

User interface controls module 210 may act as an interface between a developer environment or tool and the content management.

Match detector 220 may apply suitable algorithms to detect matches of digital content that is received at the virtual experience platform with reference assets. In some implementations, match detector 220 may compare the received assets with the reference assets by applying suitable algorithms.

Embeddings generator 230 may be utilized to generate embeddings based on the digital content/assets. In some implementations, the embeddings generator may be utilized to generate vector representations of the digital assets that can be utilized for detection of impermissible content and/or determination of semantically similar content/assets. In some implementations, the embeddings generator may include generators of different types of embeddings that may be based on a type of digital asset for which the embedding is to be generated.

In some implementations, match detector 220 may apply other techniques to determine impermissible content. For example, images may be analyzed for inclusion of objectionable content. In some implementations, hashing techniques may be utilized to match the received content with reference hashes of copyrighted and other impermissible content.

Similarity detector 240 is utilized to determine one or more designated assets that are semantically similar to a received digital asset.

Figure 3:
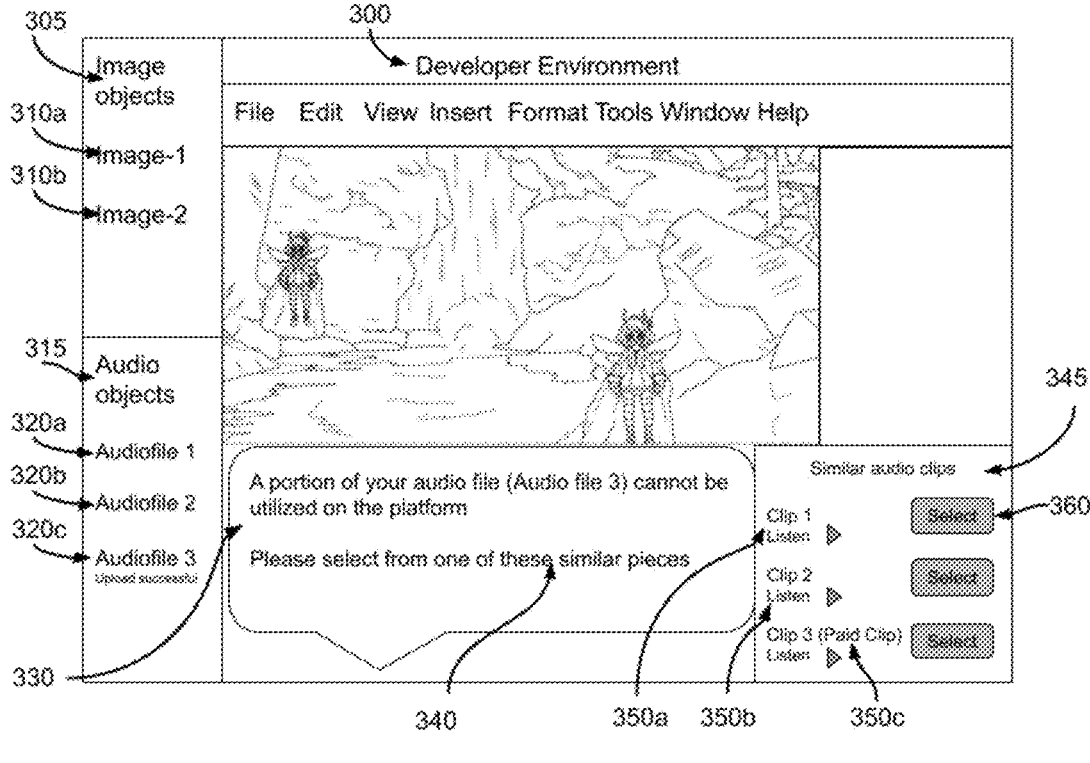
FIG. 3 is a diagram illustrating an example user interface within a developer environment, in accordance with some implementations.

FIG. 3 is a diagram illustrating an example user interface within a developer environment, in accordance with some implementations.

FIG. 3 shows an example of a virtual experience development environment (developer tool) 300, in accordance with some implementations. The virtual experience development environment may provide a user interface that enables a developer user to design and/or create virtual experiences, e.g., games. One example of the virtual experience development environment is Roblox™ Studio from Roblox™ Corporation. Other development tools and development environments provided by other companies may be used in various embodiments. The virtual experience development environment 300 may be a client-based tool (e.g., downloaded and installed on a client device, and operated from the client device), a server-based tool (e.g., installed and executed at a server that is remote from the client device, and accessed and operated by the client device), or a combination of both client-based and service-based elements.

The virtual experience development environment 300 may be operated by a developer of a virtual experience, e.g., a game developer or any other person who seeks to create a virtual experience that may be published by an online virtual experience platform and utilized by others. The user interface of the virtual experience development environment may be rendered on a display screen of a client device, e.g., such as a developer device 130 described with reference to FIG. 1, so as to enable the creator/developer to interact with the development environment 300 using actions such as typing, highlighting, selecting, drag and drop, clicking, and so forth via a mouse, keyboard, or other input device configured to communicate with the user interface. The user interface may include a menu bar, a tool bar, a workspace pane, and a plurality of secondary panes. Depending on the particular implementation, the user interface may include alternative or additional elements, arrangements, operational features, etc. of the virtual experience development environment than what is shown and described herein with respect to in FIG. 3. Thus, it is understood that the various elements and operation of the example virtual experience development environment and user interface shown in FIG. 3 are for purposes of illustration and explanation herein and that variations/modifications thereof are possible.

A developer user (creator) may utilize the virtual experience development environment to create virtual experiences. As part of the development process, the developer/creator may upload various types of digital content such as image files, audio files, short videos, etc., to enhance the virtual experience. For example, a developer user may upload one or more image objects (files) 305 (images 310*a* and 310*b*) or audio objects (files e.g., 320*a*, 320*b*, and 320*c*) 315 to be utilized in a virtual experience.

One or more techniques may be utilized by the virtual experience platform operator to detect impermissible content. The impermissible content may include content that is copyrighted material that is not usable on the platform, content that is owned by another user or developer, content that includes objectionable content, content that is not age-appropriate for users of particular ages, etc.

Upon detection of impermissible content, the platform may provide a notification to the developer user that the content provided includes impermissible content. For example, a notification 340 may be provided via the user interface to alert the user that some or all portions of the content provided by the user cannot be utilized (330).

In some implementations, suitable alternatives to the impermissible content may automatically be suggested via a notification (345) via the user interface to the user, so as to enable the developer user to select a suitable replacement to the impermissible content.

A list of alternate content that is semantically similar may be provided (345) to the user, e.g., audio files/clips 350*a*. 350*b*, and 350*c*. In some implementations, the developer user may be enabled to view/listen to the alternate content. This may enable the developer user to customize the virtual experience.

In some implementations, the developer user may be provided with an option to select (360) alternate content. Upon receiving the selection of alternate content, the virtual experience platform may replace the impermissible content with the selected content. In some implementations, the developer user may be enabled to provide a replacement content of their own, e.g., not suggested by the virtual experience platform.

Figure 4:
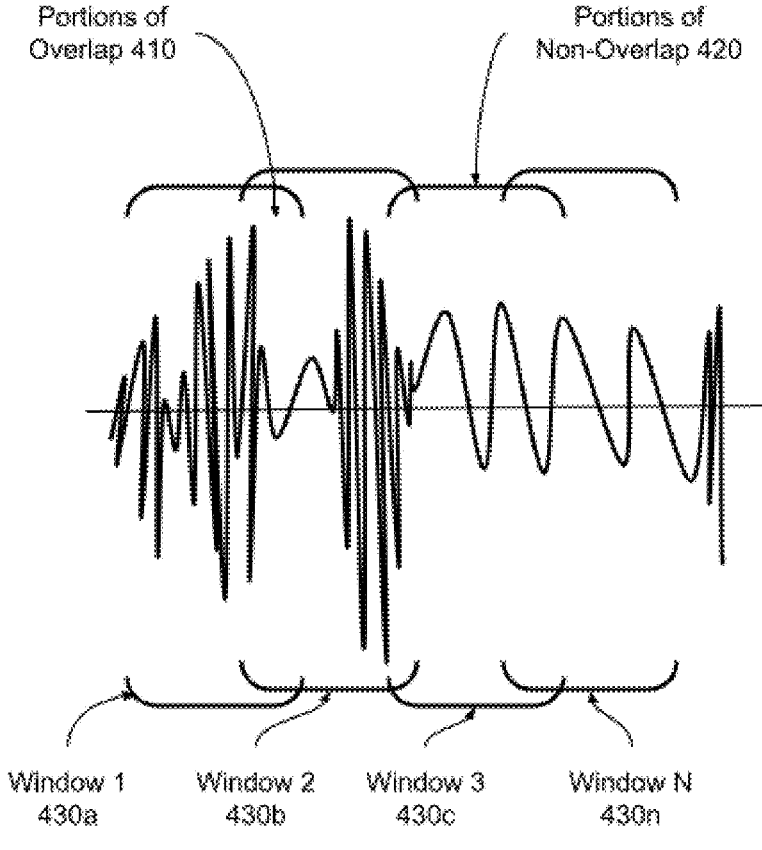
FIG. 4 is a diagram that depicts an example generation of sliding window segments of a digital audio file, in accordance with some implementations.

FIG. 4 is a diagram that depicts an example generation of sliding window segments of a digital audio file, in accordance with some implementations.

A digital audio file is a representation of sound recorded in, or converted into, digital form. In digital audio, the sound wave of the audio signal is commonly encoded as numerical samples as a continuous sequence. The audio files include a value for each point in time. The value at each point is a representation of amplitude of the signal, which is then utilized by a device playing back the music to recreate the original audio sound(s).

The audio file may be in any of many different formats, e.g., mp3, wav, AIFF, AU, PCM, etc. Each of the different formats may apply different encoding schemes and compression algorithms and may have varying degrees of efficiency, loss, etc.

In this illustrative example, FIG. 4 depicts a magnified view of a portion of the digital audio file. As can be seen in FIG. 4, the audio file is separated into sliding window segments (window 1 (430*a*), window 2 (430*b*), window 3 (430*c*), . . . , window N (430*n*)), where each segment overlaps with at least one neighboring segment and whereby the sliding window segments taken together span the length of the audio file. As depicted in FIG. 4, the sliding window segments may include portions of overlap (410) and portions of non-overlap (420).

The sliding window segments may be generated based on configurable parameters that are used to determine a window length, a hop length, and an overlap length of the sliding window segments.

The window length is the length of the fixed intervals in which the audio signal is separated. The hop length is the length of the non-intersecting portion of window length, while the overlap length is the length of the intersecting portion of the window length.

Per techniques of this disclosure, embeddings of the audio file are generated based on an analysis of the audio file. In some implementations, the analysis is performed on a sliding window basis, whereby the audio segment is analyzed based on portions that are smaller than the entire length of the audio file (e.g., each sliding window segment has a length that is less than a length of an entire audio file).

FIG. 5 is a flowchart illustrating an example method to replace one or more detected segments of an audio file with semantically similar designated segments of audio, in accordance with some implementations.

In some implementations, method 500 can be implemented to modify an audio file for use in a virtual experience, for example, on virtual experience server 102 described with reference to FIG. 1. In some other implementations, method 500 can be implemented, for example, on one or more sound servers described with reference to FIG. 1. In described examples, the implementing system includes one or more digital processors or processing circuitry ("processors"), and one or more storage devices (e.g., a data store 120 or other storage). In some implementations, different components of one or more servers and/or clients can perform different blocks or other parts of the method 500. In some examples, a first device is described as performing blocks of method 500. Some implementations can have one or more blocks of method 500 performed by one or more other devices (e.g., other client devices or server devices) that can send results or data to the first device.

Method 500 may begin at block 510. At block 510, an audio file is received. In some implementations, the audio file is received at a server, e.g., virtual experience server 102, via a user interface provided on a developer device 130 described with reference to FIG. 1. In some implementations, the audio file may include audio content that is to be included in a virtual experience that is being designed by a developer user. The audio content may be uploaded via a user interface that is provided within a developer tool or environment, e.g., developer environment 300 described with reference to FIG. 3.

In some implementations, the audio file is associated with a virtual environment, and may be played within the virtual environment by a server during gameplay and/or user participation in the virtual environment. For example, the audio file may be played or caused to be played on a user device, e.g., user device 110 by a server, e.g., by virtual experience server 102 during user participation in a virtual experience or gameplay participation by a user to provide the user with sounds for the virtual experience. Block 510 may be followed by block 520.

At block 520, it is determined whether at least one segment (portion) of the audio file includes impermissible content. In some implementations, the determination is made whether there is a match of at least one segment of the audio file with a segment of one or more reference audio file(s). For example, a process that executes at the virtual experience platform may, upon receiving the audio file, perform the determination of the match of one or more segments of the audio file with one or more reference audio file(s).

In some implementations, the one or more reference audio files may include known prior instances of audio and/or sound files that are stored within the virtual experience platform. For example, the one or more reference audio files may include audio files that are owned by developer users in the platform. In some implementations, the one or more reference audio files may include audio files under copyright protection.

In some implementations, determination whether there is a match of at least one segment of the audio file with a segment of one or more reference audio files is based on whether there is a match of embeddings generated from the segments of the (received) audio file with one or more segments of reference audio files.

In some implementations, determination of impermissible content may include determination of impermissible content based on specific data associated with the virtual experience associated with the audio file. For example, the content may be analyzed taking into account a type, category, or other rating or classification of the experience, metadata associated with the game, an analysis of previous users who have participated in the virtual experience, etc.

For example, the determination of impermissible content may include a determination based on a geographic region where the virtual experience is hosted and/or viewed. In some scenarios, a particular digital asset (content) may be permitted for use in a first geographic location/region, but may not be permitted for use in a second geographic location/region, e.g., due to a limited copyright license for the content.

Similarly, the determination of impermissible content may include a determination based on an age of a user that is being provided with the virtual experience. For example, a particular content may be permissible for a first set of users that meet a particular age threshold, but may be impermissible for a second set of users that do not meet the age threshold.

In some implementations, the determination and replacement of impermissible content may include determining impermissibility based on geographic information and/or other user information associated with the developer user or a target audience for the virtual experience.

In some implementations, when an audio file (or other digital asset) is received, embeddings associated with the digital asset, e.g., audio file are determined. The embeddings may be utilized for comparison of segment(s) of the audio file with reference audio files (copyrighted content or other audio files) to perform a similarity search, e.g., to identify semantically similar content as suitable replacement content.

Embeddings are vector representations of the digital content, and may include multi-dimensional representations of the digital content, e.g., audio files, image files, etc. The embeddings have properties that enable a comparison between different digital content, and embeddings of similar content are closer (e.g., have a lower vector distance between the embeddings) in the multi-dimensional vector space when compared to embeddings of dissimilar content.

In some implementations, a large reference set of files of copyright material and/or other impermissible content is maintained, e.g., stored in digital storage. Based on the reference set of files, embeddings of the files and/or one or more segments of the files are generated. In some implementations, the generated embeddings are stored may be stored in high-speed storage (e.g., a cache). Storing the embeddings in this manner can allow comparisons to be performed faster than generating embeddings each time or using embeddings stored in storage with slower access speed, e.g., disks or other storage. Further, storing the embeddings in high-speed storage (e.g., cache) can enable performing comparisons in a cost-efficient manner, without accessing the original files (which may be stored in slower, cost-effective storage or not stored at all). In some implementations, embeddings of previously rejected digital content are stored.

In some implementations, a plurality of embeddings for the audio file are generated from corresponding sliding window segments generated from the audio file, e.g., sliding window segments such as those depicted in FIG. 4. In some implementations, sliding window segments are constructed (generated) from the audio file. Embeddings are determined for each of the sliding window segments of the audio file to generate a plurality of embeddings based on the received audio file.

Any of multiple embedding techniques may be utilized to generate the plurality of sliding window embeddings based on the received audio file. In some implementations, determining the plurality of sliding window embeddings may include determining one or more of: a YAMNet embedding, a VGGish embedding, a SSAST embedding, a PANN embedding, or a combination thereof based on the constructed sliding window segments of the audio file.

In some implementations, determining whether there is a match of the audio file with reference audio files can include comparing the embeddings of the audio file against an index of embeddings generated based on the reference files.

If it is determined that there is no match of the received audio file with a reference audio file (or alternately, if it is determined using a different technique that the received audio file does not include content that is impermissible for use on the virtual experience platform), block 520 may be followed by block 530, else block 520 may be followed by block 540.

At block 530, the audio file is classified as an authentic audio file. In some implementations, embeddings of the audio file and/or indexing information may be stored for future use. In some implementations, the audio file may be additionally analyzed at a subsequent time, e.g., when additional reference audio files are received at the virtual experience platform.

At block 540, if it is determined that there is the match, one or more designated audio segments that are semantically (e.g., acoustically) similar to the matched segment are determined. The designated audio segments may include audio segments from licensed audio files, audio segments from open-source or other publicly available audio files that are stored at a data store associated with the virtual experience platform.

In some implementations, semantically similarly content includes content humans would consider to be similar (e.g., two audio files for a same song are semantically similar). Example attributes that may utilized to determine similarity in musical content may include one or more of tempo, beat pattern, instrumentation, loudness, key, lyrics, style, gender/age/timbre of voice. Example attributes that may utilized to determine similarity in non-musical content may include one or more of loudness, pitch, whether the sound is pitched/noisy, whether the sound is sustained or impulsive, loudness contour, physical mechanism (impact, scrape, aerodynamics), etc. Based on various factors, e.g., type of sound, certain embeddings may be more suited to comparison than others and/or may differ in quality (e.g., how accurate and representative the embeddings are of the original sound, which can impact the accuracy of comparison of embeddings).

In some implementations, determining the one or more designated audio segments that are semantically similar may include determining audio segments with embeddings that meet (e.g., lie within) a threshold vector distance (e.g., predetermined threshold distance) from an embedding of the matched segment. In some implementations, the sliding window embeddings determined based on the matched segment are compared to embeddings generated from designated audio files.

In some implementations, if no similar audio segment is located (within the threshold distance), the matched segment may be replaced with a fixed stock sound. In some implementations, the matched segment may be muted, e.g., replaced with a segment of no sound. In some implementations, an audio segment nearest to the matched segment may be utilized to replace the matched segment.

In some implementations, a nearest neighbors search is performed to locate a plurality of embeddings in a set of embeddings generated from designated audio files (the reference set) that are nearest to the embedding of the matched segment. In some implementations, determining the nearest embeddings may include calculating the vector distance between the query vector (the embedding of the segment) and all stored vectors (embeddings of segments generated from designated audio files) that are available, e.g., stored in data stores associated with the virtual experience platform (referred to as the reference set).

In some implementations, a vector approximate nearest neighbors search may be performed. Performing a vector approximate nearest neighbors search method may include utilizing tree-based data structures, hashing methods, quantization techniques, neighborhood graphs, etc., to further reduce the search space and to reduce the computational time required to perform the search.

In some implementations, determining audio segments with embeddings that lie within the predetermined threshold distance from an embedding of the matched segment may include performing a fast embedding lookup of a search index associated with a reference set of designated audio segments. For example, a fast similarity search (vector similarity search) technique, e.g., FAISS. ScaNN, etc., may be applied to locate designated segments.

In some implementations, embeddings associated with the reference set may be stored in an index. Determining audio segments with embeddings that lie within the predetermined threshold distance from an embedding of the matched segment may include performing a lookup in the index to determine the match based on vector distance between embedding of the matched segment and one or more of the designated audio segments in the reference set.

In some implementations, generative artificial intelligence (AI) may be used to create (generate) audio segments that are semantically similar based on training a model to generate audio variations from embeddings. In some implementations, a 'sounds like' function that generates audio from input audio may be utilized to generate a semantically similar audio segment.

In some scenarios, the one or more designated audio segments that are semantically similar may include a relatively large list of designated audio segments. It may be advantageous to provide the user with a diverse set of choices to select from rather than a strictly rank ordered list of designated segments based on the nearest neighbors search. In some implementations, a second plurality of designated audio segments may be determined and excluded from the one or more designated audio segments based on a second predetermined threshold distance. For example, results from the search that are too similar may be discarded in favor of more varied suggestions for designated audio segments.

For example, relatively similar audio segments of the designated audio segments may be excluded by utilizing a semantic distance that includes both an upper bound distance—and lower bound threshold distance that is applied prior to displaying a selection of designated audio segments via a user interface.

In some implementations, based on a determination that a number of semantically similar audio segments meets a threshold number of semantically similar audio segments (e.g., a particular upper bound for semantically similar audio segments), the semantically similar audio segments may be randomly sampled to determine and present a smaller number of semantically similar audio segments to a user. In some implementations, clustering techniques, e.g., k-means clustering, etc., may be utilized to determine one or more clusters of sounds and a particular number of sounds, e.g., one sound, two sounds, etc., may be selected and presented to the user from each cluster. In some implementations, an upper bound vector distance threshold (between respective embeddings) for semantic similarity may be decreased from a previous value. In some implementations, based on a determination that too few sounds are identified, an upper bound vector distance threshold may be increased from a previous value.

In some implementations, the determination of designated audio segments may be based on (and tailored to) a profile of a creator of the virtual experience and/or attributes of the virtual experience. For example, a history of previous replacements of audio segments performed for virtual experiences associated with a creator of the virtual experience may be considered when determining designated audio segments and segments that the creator has previously used may be selected with a greater likelihood as designated audio segments.

In some implementations, the determination of designated audio segments may be based on (and tailored to) a context of the virtual experience associated with the audio file.

In some implementation, a category and/or genre of a virtual experience may be utilized to determine designated audio segments. For example, if a virtual experience is a horror game, selection of designated audio segments for the horror game may be adjusted to assign a higher weight (associated with higher likelihood of selection) to types of sounds and/or music found in horror games.

Block 540 may be followed by block 550.

At block 550, a listing of the one or more designated audio segments may be displayed via a user interface. The user interface may also enable a user to play back the one or more designated segments.

In some implementations, the list may be a ranked list of the one or more designated audio segments, that displays the designated audio segments in order of semantic similarity. A subset of the designated audio segments, e.g., the closest match, may be highlighted. In some implementations, the length of the one or more designated audio segments is matched to the length of the portion identified as impermissible content.

In some implementations, the length of the designated audio segment may be greater than the length of the matched segment (the audio segment to be replaced). Tools, e.g., a slider may be provided to enable a user to select a portion of the designated audio segment to match a length of a portion of the audio file that is to be replaced.

In some implementations, the designated audio segments may be cropped to a length that is slightly greater than the length of the matched segment and blended in to the audio track, e.g., using crossfades. In some scenarios, a designated audio segment may have a number of audio channels that is different than a number of audio channels of the matched segment. In such scenarios, the designated audio segment is converted (modified) such that a number of channels of the cropped version of the designated audio segment matches the number of channels in the matched segment.

In some implementations, an option may be provided for the user to upload another audio file. In some implementations, for scenarios where a replacement is to be made within a limited time budget, a classification/category may be determined for the matched segment, and a designated audio segment may be determined based on identifying an audio segment from a set of designated audio segments that matches the category or type of the matched segment of the audio file. In some implementations, the classification/category may be additionally based on a context of the virtual experience. Block 550 may be followed by block 560.

At block 560, a selection of the designated audio segment of the one or more designated audio segments may be received via the user interface. Block 560 may be followed by block 570.

At block 570, the matched segment of the audio file is replaced with a designated audio segment of the one or more designated audio segments.

Blocks 510-570 can be performed (or repeated) in a different order than described above and/or one or more steps can be omitted. For example, block 520 may be performed multiple times, e.g., to compare a plurality of audio files with reference audio file(s). In this manner, portions of method 500 may be repeated until multiple segments of multiple audio files are compared to all reference audio files that are stored in the platform. The identification of semantically similar audio segments and the replacement (blocks 540-570) may be performed subsequent to the identification of the matched segments.

Figure 6:
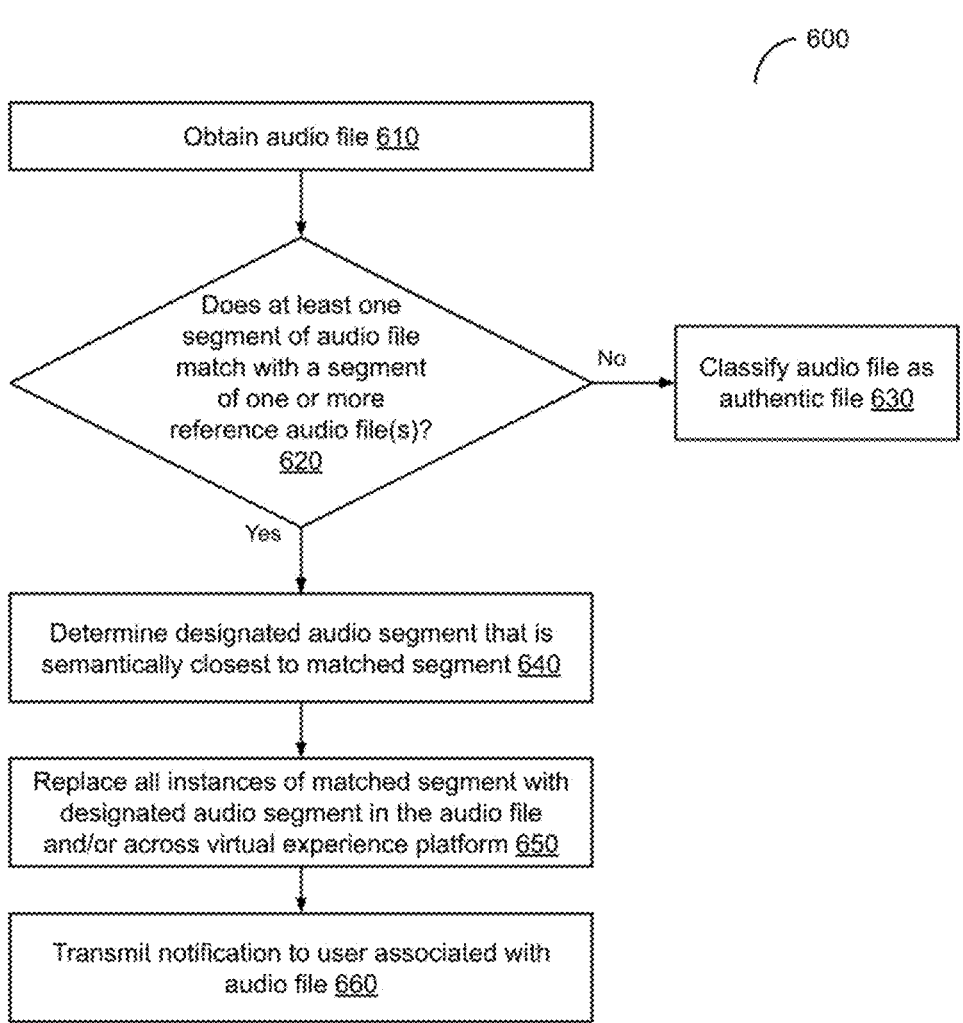
FIG. 6 is a flowchart illustrating another example method to replace particular detected segments of an audio file with semantically similar designated segments, in accordance with some implementations.

FIG. 6 is a flowchart illustrating another example method to replace particular detected segments of an audio file with semantically similar designated segments of audio, in accordance with some implementations.

In some implementations, method 600 can be implemented to modify an audio file for use in a virtual experience, for example, on virtual experience server 102 described with reference to FIG. 1. In some other implementations, method 600 can be implemented, for example, on one or more sound servers described with reference to FIG. 1. In described examples, the implementing system includes one or more digital processors or processing circuitry ("processors"), and one or more storage devices (e.g., a data store 120 or other storage). In some implementations, different components of one or more servers and/or clients can perform different blocks or other parts of the method 600. In some examples, a first device is described as performing blocks of method 600. Some implementations can have one or more blocks of method 600 performed by one or more other devices (e.g., other client devices or server devices) that can send results or data to the first device.

Method 600 may begin at block 610. At block 610, an audio file is obtained. The audio file may be obtained from a data store associated with a virtual experience platform. In some implementations, the audio file may be an audio file that was previously uploaded to the virtual experience, e.g., by a user developer, for use in one or more virtual experiences. In some implementations, the audio file is associated with a virtual environment, and may be played within the virtual environment by a server during gameplay and/or user participation in the virtual environment. For example, the audio file may be played or caused to be played over a user device, e.g., user device 110 by a server, e.g., by virtual experience server 102 during gameplay and user participation in the virtual environment such as user participation in a virtual experience or gameplay participation by a user. Block 610 may be followed by block 620.

At block 620, it is determined whether at least one segment of a plurality of segments of the audio file includes impermissible content, e.g., by matching each segment of the plurality of segments against one or more reference audio files. If it is determined that there is a match of at least one segment of the plurality of segments of the audio file with a segment of the one or more reference audio files, then block 620 may be followed by block 630, else block 620 may be followed by block 640.

At block 640, a designated audio segment is determined that is semantically closest to the matched segment. Block 640 may be followed by block 650.

At block 650, all instances of the matched segment of the audio file are replaced with the designated segment across the virtual experience platform. For example, one or more data stores may be searched for instances of utilization of the audio file, and all instances of the matched segments that are identified may be replaced with the designated segment. In some implementations, the replacement may be performed via replacement of one or more links, e.g., pointers, that include a reference to a location of the matched segment, with a reference to a location of the designated segment. Block 650 may be followed by block 660.

At block 660, a notification may be transmitted to a user associated with the audio file. For example, the notification may be transmitted to the developer user who uploaded the audio file to the virtual experience platform. The notification may include information about the matched segment as well as the designated audio segment that was used to replace the matched segment.

Blocks 610-660 can be performed (or repeated) in a different order than described above and/or one or more steps can be omitted.

FIG. 7 is a block diagram of an example computing device 700 which may be used to implement one or more features described herein. In one example, device 700 may be used to implement a computer device (e.g., 102, 110 and/or 130 of FIG. 1), and perform suitable method implementations described herein. Computing device 700 can be any suitable computer system, server, or other electronic or hardware device. For example, the computing device 700 can be a mainframe computer, desktop computer, workstation, portable computer, or electronic device (portable device, mobile device, cell phone, smartphone, tablet computer, television, TV set top box, personal digital assistant (PDA), media player, game device, wearable device, etc.). In some implementations, device 700 includes a processor 702, a memory 704, input/output (I/O) interface 706, and audio/video input/output devices 714.

Processor 702 can be one or more processors, processing devices, and/or processing circuits to execute program code and control basic operations of the device 700. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 704 is typically provided in device 700 for access by the processor 702, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 702 and/or integrated therewith. Memory 704 can store software operating on the server device 700 by the processor 702, including an operating system 708, one or more applications 710, e.g., an audio spatialization application, a sound application, content management application, and application data 712. In some implementations, application 710 can include instructions that enable processor 702 to perform the functions (or control the functions of) described herein, e.g., some or all of the methods described with respect to FIGS. 5 and 6.

For example, applications 710 can include an audio spatialization module which as described herein can provide audio spatialization within an online virtual experience server (e.g., 102). Any software in memory 704 can alternatively be stored on any other suitable storage location or computer-readable medium. In addition, memory 704 (and/ or other connected storage device(s)) can store instructions and data used in the features described herein. Memory 704 and any other type of storage (magnetic disk, optical disk, magnetic tape, or other tangible media) can be considered "storage" or "storage devices."

I/O interface 706 can provide functions to enable interfacing the server device 700 with other systems and devices. For example, network communication devices, storage devices (e.g., memory and/or data store 108), and input/ output devices can communicate via interface 706. In some implementations, the I/O interface can connect to interface devices including input devices (keyboard, pointing device, touchscreen, microphone, camera, scanner, etc.) and/or output devices (display device, speaker devices, printer, motor, etc.).

The audio/video input/output devices 714 can include a user input device (e.g., a mouse, etc.) that can be used to receive user input, a display device (e.g., screen, monitor, etc.) and/or a combined input and display device, that can be used to provide graphical and/or visual output.

For ease of illustration, FIG. 7 shows one block for each of processor 702, memory 704, I/O interface 706, and software blocks 708 and 710. These blocks may represent one or more processors, processing devices, or processing circuitries, operating systems, memories, I/O interfaces, applications, and/or software engines. In other implementations, device 700 may not have all of the components shown and/or may have other elements including other types of elements instead of, or in addition to, those shown herein. While the online virtual experience server 102 is described as performing operations as described in some implementations herein, any suitable component or combination of components of online virtual experience server 102 or similar system, or any suitable processor or processors associated with such a system, may perform the operations described.

A user device can also implement and/or be used with features described herein. Example user devices can be computer devices including some similar components as the device 700, e.g., processor(s) 702, memory 704, and I/O interface 706. An operating system, software and applications suitable for the user device can be provided in memory and used by the processor. The I/O interface for a user device can be connected to network communication devices, as well as to input and output devices, e.g., a microphone for capturing sound, a camera for capturing images or video, a mouse for capturing user input, a gesture device for recognizing a user gesture, a touchscreen to detect user input, audio speaker devices for outputting sound, a display device for outputting images or video, or other output devices. A display device within the audio/video input/output devices 714, for example, can be connected to (or included in) the device 700 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein (e.g., methods 500, 600, etc.) can be implemented by computer program instructions or code, which can be executed on a computer. For example, the code can be implemented by one or more digital processors (e.g., microprocessors or other processing circuitry), and can be stored on a computer program product including a non-transitory computer-readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g., Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating systems.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a user device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method, comprising:
receiving, by a processor, an audio file, wherein the audio file is associated with a virtual environment;
determining whether there is a match of a segment of the audio file with one or more reference audio files based on a comparison of an embedding of the segment of the audio file with respective embeddings of the one or more reference audio files; and
based on a determination that there is the match:
identifying, one or more designated audio segments that are semantically similar to the segment, wherein identifying the one or more designated audio segments that are semantically similar comprises identifying one or more audio segments associated with respective embeddings that lie within a threshold distance from the embedding of the segment;
replacing the segment of the audio file with a particular designated audio segment of the one or more designated audio segments to generate a modified audio file, wherein replacing the segment of the audio file with the particular designated audio segment of the one or more designated audio segments to generate the modified audio file comprises cropping the particular designated audio segment to a length greater than a length of the segment, and blending the particular designated audio segment into the modified audio file; and
playing the modified audio file to generate sound within the virtual environment during one or more of: gameplay and user participation in the virtual environment.

2. The computer-implemented method of claim 1, wherein based on the determination that there is the match, the method further comprises selecting the particular designated audio segment based on a determination that the particular designated audio segment of the one or more designated audio segments is semantically closest to the segment.

3. The computer-implemented method of claim 1, wherein based on the determination that there is the match, the method further comprises:
displaying, via a user interface, a listing of the one or more designated audio segments; and
receiving, via the user interface, selection of the particular designated audio segment of the one or more designated audio segments.

4. The computer-implemented method of claim 1, further comprising:
obtaining a plurality of sliding window segments of the audio file, each sliding window segment with a length less than a length of the audio file; and generating a respective embedding for one or more of the plurality of sliding window segments generated from the audio file.

5. The computer-implemented method of claim 1, wherein identifying the one or more audio segments comprises performing a vector approximate nearest neighbors search.

6. The computer-implemented method of claim 5, wherein performing the vector approximate nearest neighbors search comprises:
obtaining a plurality of sliding window segments of the audio file, each sliding window segment with a length less than a length of the audio file;
generating a respective embedding for one or more of the plurality of sliding window segments generated from the audio file; and
performing a search based on a plurality of sliding window embeddings generated from the audio file.

7. The computer-implemented method of claim 1, further comprising determining a second plurality of designated audio segments that is excluded from the one or more designated audio segments based on a second predetermined threshold distance.

8. The computer-implemented method of claim 1, wherein based on the determination that there is the match, the method further comprises storing embeddings associated with a reference set of the one or more designated audio segments in an index, and wherein identifying the one or more designated audio segments is based on a vector distance between the embedding of the segment and an embedding of one or more of the designated audio segments in the reference set.

9. A non-transitory computer-readable medium comprising instructions that, responsive to execution by a processing device, cause the processing device to perform operations comprising:
receiving an audio file, wherein the audio file is associated with a virtual environment;
determining whether there is a match of a segment of the audio file with one or more reference audio files based on a comparison of an embedding of the segment of the audio file with respective embeddings of the one or more reference audio files; and
based on a determination that there is the match:
identifying, one or more designated audio segments that are semantically similar to the segment, wherein identifying the one or more designated audio segments that are semantically similar comprises identifying one or more audio segments associated with respective embeddings that lie within a threshold distance from the embedding of the segment;
replacing the segment of the audio file with a particular designated audio segment of the one or more designated audio segments to generate a modified audio file, wherein replacing the segment of the audio file with a particular designated audio segment of the one or more designated audio segments to generate a modified audio file comprises cropping the particular designated audio segment to a length greater than a length of the segment, and blending the particular designated audio segment into the modified audio file; and
playing the modified audio file to generate sound within the virtual environment during one or more of: gameplay and user participation in the virtual environment.

10. The non-transitory computer-readable medium of claim 9, wherein based on the determination that there is the match, the operations further comprise selecting the particular designated audio segment based on a determination that the particular designated audio segment of the one or more designated audio segments is semantically closest to the segment.

11. The non-transitory computer-readable medium of claim 9, wherein based on the determination that there is the match, the operations further comprise:

displaying, via a user interface, a listing of the one or more designated audio segments; and receiving, via the user interface, selection of the particular designated audio segment of the one or more designated audio segments.

12. The non-transitory computer-readable medium of claim 11, wherein the operations further comprise:

obtaining a plurality of sliding window segments of the audio file, each sliding window segment with a length less than a length of the audio file; and generating a respective embedding for one or more of the plurality of sliding window segments generated from the audio file.

13. A system comprising:

a memory with instructions stored thereon; and a processing device, coupled to the memory, the processing device configured to access the memory and execute the instructions, wherein the instructions cause the processing device to perform operations including:

receiving, by the processing device, an audio file, wherein the audio file is associated with a virtual environment;

determining whether there is a match of a segment of the audio file with one or more reference audio files based on a comparison of an embedding of the segment of the audio file with respective embeddings of the one or more reference audio files; and based on a determination that there is the match:

identifying, one or more designated audio segments that are semantically similar to the segment, wherein identifying the one or more designated audio segments that are semantically similar comprises identifying one or more audio segments associated with respective embeddings that lie within a threshold distance from the embedding of the segment;

replacing the segment of the audio file with a particular designated audio segment of the one or more designated audio segments to generate a modified audio file, wherein replacing the segment of the audio file with a particular designated audio segment of the one or more designated audio segments to generate a modified audio file comprises cropping the particular designated audio segment to a length greater than a length of the segment, and blending the particular designated audio segment into the modified audio file; and playing the modified audio file to generate sound within the virtual environment during one or more of: gameplay and user participation in the virtual environment.

14. The system of claim 13, wherein based on the determination that there is the match, the operations further comprise selecting the particular designated audio segment based on a determination that the particular designated audio segment of the one or more designated audio segments is semantically closest to the segment.

15. The system of claim 13, wherein identifying the one or more audio segments comprises performing a vector approximate nearest neighbors search.

16. The system of claim 15, wherein performing the vector approximate nearest neighbors search comprises:

obtaining a plurality of sliding window segments of the audio file, each sliding window segment with a length less than a length of the audio file;

generating a respective embedding for one or more of the plurality of sliding window segments generated from the audio file; and performing a search based on a plurality of sliding window embeddings generated from the audio file.

17. The system of claim 13, wherein based on the determination that there is the match, the operations further comprise storing embeddings associated with a reference set of the one or more designated audio segments in an index, and wherein identifying the one or more designated audio segments is based on a vector distance between the embedding of the segment and an embedding of one or more of the designated audio segments in the reference set.

\* \* \* \* \*